Patented Nov. 18, 1952

2,618,630

UNITED STATES PATENT OFFICE 2,618,630

NITROBENZENEAZO-N-TRIFLUOROALKYL-N-HYDROXYALKYLANILINE DYE COMPOUNDS

Joseph B. Dickey, Rochester, N. Y., assignor to Eastman Kodak Company, Rochester, N. Y., a corporation of New Jersey No Drawing. Application September 9, 1949, Serial No. 114,913

7 Claims. (Cl. 260—207.3)

This invention relates to new azo compounds containing a trifluoroalkylamino group and their application to the art of dyeing or coloring textile materials made of or containing a cellulose alkyl carboxylic acid ester having 2 to 4 carbon atoms in the acid groups thereof.

It is known to prepare azo dyes containing a $CF_3$ group. However, so far as I am aware, in every instance the $CF_3$ group is directly attached to an aryl group. By contrast, the fluoroalkyl group present in the compounds of my invention is (1) joined to a benzene nucleus through an amino group rather than directly and (2) has 2 or 3 carbon atoms rather than a single carbon atom.

Angewandte Chemie, vol. 52, page 457 (1939) states that aminobenzotrifluoride and its derivatives when diazotized and coupled with Naphthol AS Grounding components give valuable color tones of exceptional light fastness. The combination of one of these aminobenzotrifluoride bases with Naphthol AS is said to be the red dye used in the German flag.

The Angewandte Chemie article refers to German Patents 551,882 [U. S. 1,999,610], 588,781 [U. S. 2,015,204] and 590,255 to illustrate the dye compounds mentioned in the article. These German patents disclose cotton ingrain azo dyes prepared by coupling diazotized aminobenzotrifluoride compounds with 2,3-oxynaphthoic acid arylides (Naphthol AS Grounding components).

Although efforts have been made to apply Naphthol AS type dyes to cellulose acetate textile materials, these dye compounds have no utility for cellulose acetate textile materials. The dye compound

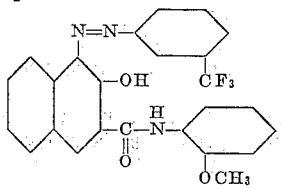

Compound 2 of tabulation of German patent 551,882 is typical of the compounds disclosed by the three German patents above mentioned. Hence, in Gilman, Organic Chemistry, 2nd ed., page 963 (1943), alludes to the light-fast trifluoromethyl ingrain azo dyes discussed in the Angewandte Chemie article and states that the red dye used in the German flag "bears a $CF_3$ group on a naphthyl radical."

That many azo compounds having a $CF_3$ group are poor dyes for cellulose acetate textile materials will be further apparent from the fact that the following azo compounds yield dyeings on cellulose acetate textile materials which have poor fastness to light:

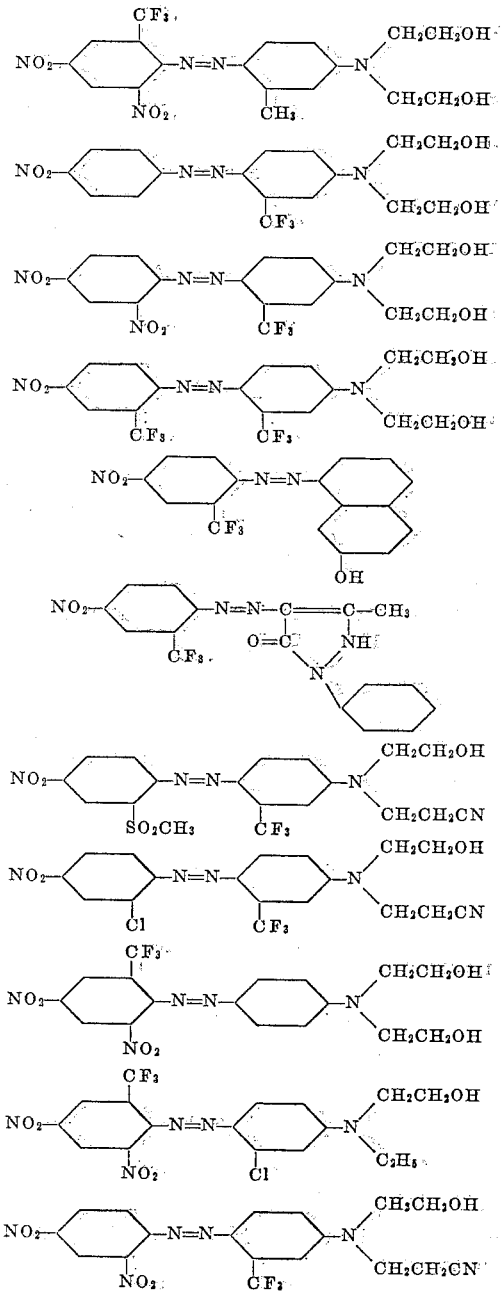

It will be understood that the foregoing dye compounds are merely illustrative of azo compounds containing a CF₃ group which yield dyeings on cellulose acetate textile materials having poor light fastness. There are many more such compounds.

After much investigation, I have discovered that the azo compounds having the formula:

I.
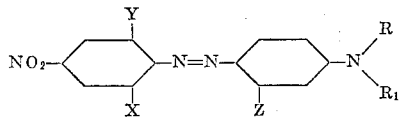

wherein R represents a β-hydroxyethyl group, a γ-hydroxypropyl group or a β,γ-dihydroxypropyl group, R₁ represents a 2,2,2-trifluoroethyl group or a 3,3,3-trifluoropropyl group, X represents a bromine atom or a chlorine atom, Y represents a bromine atom, a chlorine atom, a fluorine atom, a methyl group or a trifluoromethyl group, and wherein Y also represents a methylsulfone group when X represents a hydrogen atom and Z represents a hydrogen atom, a bromine atom, a chlorine atom, a methyl group or an ethyl group, are valuable dyes for coloring textile materials made of or containing a cellulose alkyl carboxylic acid ester having two to four carbon atoms in the acid groups thereof. Depending upon their structure, they color the aforesaid textile materials, for example, orange, brownish-orange, brownish-red, red and rubine shades. The dyeings obtained in addition to having excellent fastness to gas possess unusually good fastness to light.

It is an object of my invention to provide new azo dye compounds. Another object is to provide a satisfactory process for the preparation of the new azo dye compounds of the invention. A further object is to provide dyed cellulose alkyl carboxylic acid ester textile materials which possess very good fastness to light and gas. A particular object is to provide new azo compounds which are especially of value for the dyeing of cellulose acetate textile materials.

By cellulose alkyl carboxylic acid esters having two to four carbon atoms in the acid groups thereof, I mean to include, for example, both hydrolyzed and unhydrolyzed cellulose acetate, cellulose propionate, cellulose butyrate, cellulose acetate-propionate and cellulose acetate-butyrate.

The new azo dye compounds of my invention are prepared by diazotizing a primary aromatic amine having the formula:

II.
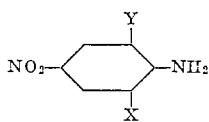

and coupling the diazonium compound obtained with a compound having the formula:

III.
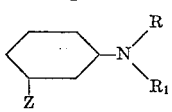

R, R₁, X, Y and Z in the foregoing formulas have the meaning previously assigned to them.

The aromatic amine compounds having the formula II that are used in the preparation of the azo compounds of my invention are: 4-nitro-2,6-dichloroaniline, 4-nitro-2-chloro-6-bromoaniline, 4-nitro-2-chloro-6-fluoroaniline, 4-nitro-2-chloro-6-methylaniline, 4-nitro-2-trifluoromethyl-6-chloroaniline, 4-nitro-2,6-dibromoaniline, 4-nitro-2-bromo-6-fluoroaniline, 4-nitro-2-bromo-6-methylaniline, 4-nitro-2-trifluoromethyl-6-bromoaniline and 5-nitro-2-aminophenylmethylsulfone.

The coupling compounds (Formula III) that are used in the preparation of the azo compounds of my invention are: N-2,2,2-trifluoroethyl-N-β-hydroxyethylaniline, N-2,2,2-trifluoroethyl-N-β-hydroxyethyl-m-chloroaniline, N-2,2,2-trifluoroethyl-N-β-hydroxyethyl-m-bromoaniline, N-2,2,2-trifluoroethyl-N-β-hydroxyethyl-m-toluidine, N-2,2,2-trifluoroethyl-N-β-hydroxyethyl-m-ethylaniline, N-3,3,3-trifluoropropyl-N-β-hydroxyethylaniline, N-3,3,3-trifluoropropyl-N-β-hydroxyethyl-m-chloroaniline, N-3,3,3-trifluoropropyl-N-β-hydroxyethyl-m-bromoaniline, N-3,3,3-trifluoropropyl-N-β-hydroxyethyl-m-toluidine, N-3,3,3-trifluoropropyl-N-β-hydroxyethyl-m-ethylaniline, N-2,2,2-trifluoroethyl-N-γ-hydroxypropylaniline, N-2,2,2-trifluoroethyl-N-γ-hydroxypropyl-m-chloroaniline, N-2,2,2-trifluoroethyl-N-γ-hydroxypropyl-m-bromoaniline, N-2,2,2-trifluoroethyl-N-γ-hydroxypropyl-m-toluidine, N-2,2,2-trifluoroethyl-N-γ-hydroxypropyl-m-ethylaniline, N-3,3,3-trifluoropropyl-N-γ-hydroxypropylaniline, N-3,3,3-trifluoropropyl-N-γ-hydroxypropyl-m-chloroaniline, N-3,3,3-trifluoropropyl-N-γ-hydroxypropyl-m-bromoaniline, N-3,3,3-trifluoropropyl-N-γ-hydroxypropyl-m-toluidine, N-3,3,3-trifluoropropyl-N-γ-hydroxypropyl-m-ethylaniline, N-2,2,2-trifluoroethyl-N-β,γ-dihydroxypropylaniline, N-2,2,2-trifluoroethyl-N-β,γ-dihydroxypropyl-m-chloroaniline, N-2,2,2-trifluoroethyl-N-β,γ-dihydroxypropyl-m-bromoaniline, N-2,2,2-trifluoroethyl-N-β,γ-dihydroxypropyl-m-toluidine, N-2,2,2-trifluoroethyl-N-β,γ-dihydroxypropyl-m-ethylaniline, N-3,3,3-trifluoropropyl-N-β,γ-dihydroxypropylaniline, N-3,3,3-trifluoropropyl-N-β,γ-dihydroxypropyl-m-chloroaniline, N-3,3,3-trifluoropropyl-N-β,γ-dihydroxypropyl-m-bromoaniline, N-3,3,3-trifluoropropyl-N-β,γ-dihydroxypropyl-m-toluidine and N-3,3,3-trifluoropropyl-N-β,γ-dihydroxypropyl-m-ethylaniline.

It is here noted that not all azo compounds having a 2,2,2-trifluoroethylamino group or a 3,3,3-trifluoropropylamino group yield dyeings on cellulose acetate textile materials which have good fastness to light. A number of such compounds are referred to hereinafter.

To illustrate, the azo compounds obtained by coupling the coupling compounds of my invention with the diazonium form of 2,4-dinitro-6-chloroaniline, 2,4-dinitro-6-bromoaniline, 3,5-dinitro-2-aminophenylmethylsulfone, 2,4-dinitro-6-trifluoromethylaniline and 6-N-ethylsulfoneamide-2,4-dinitroaniline yield dyeings on cellulose acetate textile materials which do not have good fastness to light. Similarly, the azo compounds prepared by diazotizing a compound having the Formula II and coupling the diazonium compound obtained with a compound having the formula:

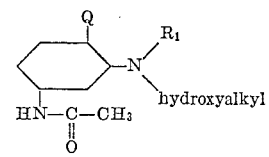

wherein R₁ represents a 2,2,2-trifluoroethyl group or a 3,3,3-trifluoropropyl group and Q represents a hydrogen atom or a methoxy group yield dyeings on cellulose acetate textile materials which do not have good fastness to light.

Also, the azo compounds obtained by diazotizing o-nitroaniline, 2-nitro-4-chloroaniline and 4- nitro-2-hydroxyaniline and coupling the diazonium compounds obtained with the coupling compounds of the present invention yield dyeings on cellulose acetate textile materials which do not have good fastness to light.

The following examples illustrate the azo compounds of my invention and their manner of preparation:

EXAMPLE 1

A. *Preparation of nitrosyl sulfuric acid*

7.6 grams of dry sodium nitrite were added with stirring to 50 cc. of sulfuric acid (sp. gr. 1.84) while keeping the temperature below 70° C. The resulting reaction mixture was then cooled to 15° C.–20° C. and 100 grams of acetic acid were added dropwise with stirring, following which the reaction mixture was cooled to 8° C.–10° C.

B. *Diazotization*

20.7 grams of 4-nitro-2,6-dichloroaniline were added portionwise, with stirring, to a nitrosyl sulfuric acid mixture prepared as described above and simultaneously 100 grams of cold glacial acetic acid were added. The reaction mixture was stirred while keeping the temperature at about 15° C. until the diazotization reaction was complete. A clear yellowish diazonium solution was obtained.

C. *Coupling*

21.9 grams of N-2,2,2-trifluoroethyl-N-β-hydroxyethylaniline were dissolved in 300 cc. of 12½% sulfuric acid. The resulting solution was cooled to 0° C.–10° C. by adding crushed ice with stirring. Then the diazonium solution, prepared as described above, was added to the reaction mixture with stirring. Coupling takes place rapidly. The reaction mixture was cooled with crushed ice, for example, as needed to keep the reaction temperature at about 10° C.–15° C. The reaction mixture was stirred for about one-half hour after the addition of the diazonium solution and then slowly made neutral to Congo red paper with sodium bicarbonate after which it was allowed to stand for one hour. The dye compound formed was recovered by filtration, washed free of any salts with water and dried. The azo dye compound thus obtained has the formula:

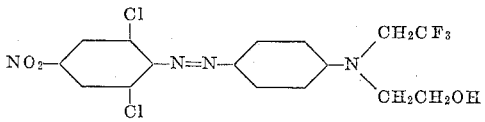

It colors cellulose acetate textile materials orange shades which have excellent fastness to light and gas.

By contrast, the azo compound of the formula:

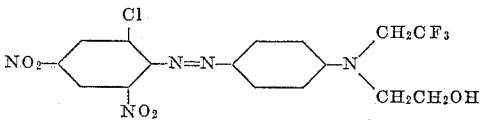

colors cellulose acetate textile materials rubine shades which have poor fastness to light.

EXAMPLE 2

24.1 grams of 4-nitro-2-trifluoromethyl-6-chloroaniline are diazotized in accordance with the procedure described in Example 1 and the diazonium compound obtained is coupled with 21.9 grams of N-2,2,2-trifluoroethyl-N-β-hydroxyethylaniline. Coupling and recovery of the dye compound formed is carried out in accordance with the procedure described in Example 1. The dye compound obtained has the formula:

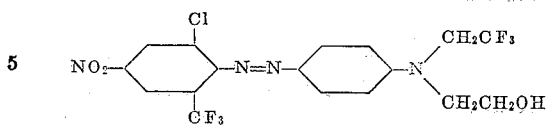

It colors cellulose acetate textile materials orange shades which have excellent fastness to light and gas.

By contrast, the azo compound of the formula:

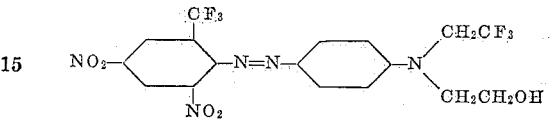

colors cellulose acetate textile materials rubine shades which have poor fastness to light.

EXAMPLE 3

A. *Diazotization*

21.6 grams of finely powdered 5-nitro-2-aminophenylmethylsulfone were added slowly, with stirring, to the nitrosyl sulfuric acid reaction mixture prepared as described in Example 1. The reaction temperature was maintained below 20° C. After the addition of the amine, 100 grams of acetic acid were added dropwise with stirring and the reaction mixture was stirred at 15° C.–20° C. until all of the amine had dissolved and the diazotization reaction which takes place was complete. The diazonium solution was then poured onto 500 grams of crushed ice and enough urea or sulfamic acid was added to destroy the excess nitrous acid. The diazonium solution should be clear and free of suspended, undiazotized amine.

B. *Coupling*

10 grams of sulfuric acid (sp. gr. 1.84) were added to 20 cc. of water and the resulting solution was cooled to 5° C. and then 23.3 grams of N-3,3,3-trifluoropropyl-N-β-hydroxyethylaniline were added while cooling. When solution was complete, 200 grams of crushed ice and 200 cc. of ice cold water were added to the reaction mixture. Then the diazonium solution prepared as described in Example 1 was added with stirring. Upon completion of the coupling reaction which takes place, sufficient sodium carbonate to neutralize the mineral acid present was slowly added to the reaction mixture. In this as well as in the other examples sufficient diazonium solution should be used to give a slight positive test (for a diazo solution) when all the coupling component has reacted. The dye compound formed was recovered by filtration on a Buchner funnel, washed free of salts with water, and air dried. The dye compound obtained has the formula:

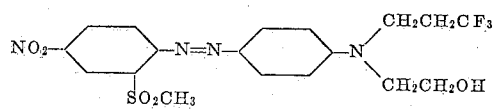

and colors cellulose acetate textile materials red shades of excellent fastness to light and gas.

By contrast, the azo compound of the formula:

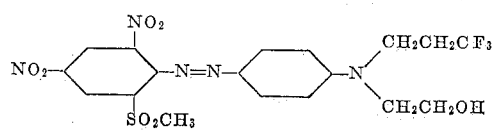

colors cellulose acetate textile materials rubine shades which have poor fastness to light.

EXAMPLE 4

21.6 grams of 5-nitro-2-aminophenylmethylsulfone are diazotized in accordance with the procedure described in Example 3 and the diazonium compound obtained is coupled with 21.9 grams of N-2,2,2-trifluoroethyl-N-β-hydroxyethylaniline. Coupling and recovery of the dye compound formed is carried out in accordance with the procedure described in Example 3. The dye compound obtained colors cellulose acetate textile materials orange shades which have excellent fastness to light and gas.

By contrast, the azo compound of the formula:

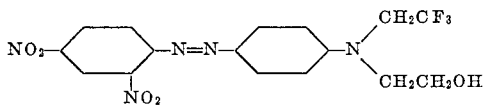

colors cellulose acetate textile materials red shades which have poor fastness to light.

EXAMPLE 5

20.7 grams of 4-nitro-2,6-dichloroaniline are diazotized in accordance with the procedure described in Example 1 and the diazonium compound obtained is coupled with 23.3 grams of N-3,3,3-trifluoropropyl-N-β-hydroxyethylaniline. Coupling and recovery of the dye compound formed is carried out in accordance with the procedure described in Example 1. The dye compound obtained colors cellulose acetate textile materials reddish-brown shades which have excellent fastness to light and gas.

By contrast, the azo compound of the formula:

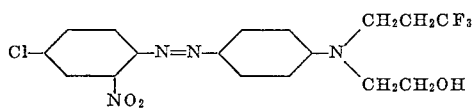

colors cellulose acetate textile materials yellowish-orange shades which have poor fastness to light.

EXAMPLE 6

24.1 grams of 4-nitro-2-trifluoromethyl-6-chloroaniline are diazotized in accordance with the procedure described in Example 1 and the diazonium compound obtained is coupled with 23.3 grams of N-3,3,3-trifluoropropyl-N-β-hydroxyethylaniline. Coupling and recovery of the dye compound formed is carried out in accordance with the procedure described in Example 1. The dye compound obtained colors cellulose acetate textile materials reddish-brown shades.

EXAMPLE 7

21.6 grams of 5-nitro-2-aminophenylmethylsulfone are diazotized in accordance with the procedure described in Example 3 and the diazonium compound obtained is coupled with 23.3 grams of N-2,2,2-trifluoroethyl-N-γ-hydroxypropylaniline. Coupling and recovery of the dye compound formed is carried out in accordance with the procedure described in Example 3. The dye compound obtained colors cellulose acetate textile materials orange shades.

By the use of 24.9 grams of N-2,2,2-trifluoroethyl-N-β,γ-dihydroxypropylaniline in place of N-2,2,2-trifluoroethyl-N-γ-hydroxypropylaniline, a dye compound is obtained which colors cellulose acetate textile materials orange shades.

EXAMPLE 8

25.2 grams of 4-nitro-2-chloro-6-bromoaniline are diazotized in accordance with the procedure described in Example 1 and the diazonium compound obtained is coupled with 21.9 grams of N-2,2,2-trifluoroethyl-N-β - hydroxyethylaniline. Coupling and recovery of the dye compound formed is carried out in accordance with the procedure described in Example 1. The dye compound obtained colors cellulose acetate textile materials orange shades.

By the use of 19.2 grams of 4-nitro-2-chloro-6-fluoroaniline in place of 4-nitro-2-chloro-6-bromoaniline, a dye compound is obtained which colors cellulose acetate textile material orange shades.

EXAMPLE 9

20.7 grams of 4-nitro-2,6-dichloroaniline are diazotized in accordance with the procedure described in Example 1 and the diazonium compound obtained is coupled with 25.3 grams of N - 2,2,2 - trifluoroethyl - N - β-hydroxyethyl-m-chloroaniline. Coupling and recovery of the dye compound formed is carried out in accordance with the procedure described in Example 1. The dye compound obtained colors cellulose acetate textile materials orange shades which have very good fastness to light and excellent fastness to gas.

By the use of 29.8 grams of N-2,2,2-trifluoroethyl-N-β-hydroxyethyl-m-bromoaniline in place of N-2,2,2-trifluoroethyl-N-β-hydroxyethyl - m-chloroaniline, a dye compound is obtained which colors cellulose acetate textile materials orange shades which have very good fastness to light and excellent fastness to gas.

By contrast, the azo compound of the formula:

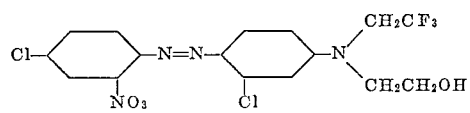

colors cellulose acetate textile materials orange shades which have poor fastness to light.

EXAMPLE 10

21.6 grams of 5-nitro-2-aminophenylmethylsulfone are diazotized in accordance with the procedure described in Example 3 and the diazonium compound obtained is coupled with 23.3 grams of N - 2,2,2 - trifluoroethyl - N - β-hydroxyethyl-m-toluidine. Coupling and recovery of the dye compound formed is carried out in accordance with the procedure described in Example 3. The dye compound obtained colors cellulose acetate textile materials red shades which have very good fastness to light and excellent fastness to gas.

By the use of 24.7 grams of N-2,2,2-trifluoroethyl-N-β-hydroxyethyl-m-ethylaniline in place of N - 2,2,2-trifluoroethyl-N-β-hydroxyethyl-m-toluidine, a dye compound is obtained which colors cellulose acetate textile materials red shades which have very good fastness to light and excellent fastness to gas.

By contrast, the azo compound of the formula:

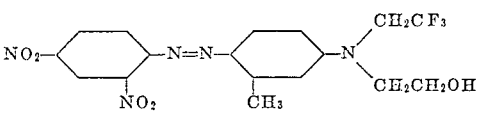

colors cellulose acetate textile materials red shades which have poor fastness to light.

EXAMPLE 11

18.7 grams of 4-nitro-2-chloro-6-methylaniline are diazotized in accordance with the procedure described in Example 1 and the diazonium compound obtained is coupled with 21.9 grams of N - 2,2,2-trifluoroethyl-N-β-hydroxyethylaniline. Coupling and recovery of the dye compound formed is carried out in accordance with the procedure described in Example 1. The dye compound obtained colors cellulose acetate textile materials orange shades.

By the use of 23.2 grams of 4-nitro-2-bromo-6-methylaniline in place of 4-nitro-2-chloro-6-methylaniline, a dye compound is obtained which colors cellulose acetate textile materials orange shades.

EXAMPLE 12

20.7 grams of 4-nitro-2,6-dichloroaniline are diazotized in accordance with the procedure described in Example 1 and the diazonium compound obtained is coupled with 26.3 grams of N - 3,3,3 - trifluoropropyl - N - β,γ - dihydroxypropylaniline. Coupling and recovery of the dye compound formed is carried out in accordance with the procedure described in Example 1. The dye compound obtained colors cellulose acetate textile materials reddish-brown shades.

By the use of 29.6 grams of 4-nitro-2,6-dibromoaniline in place of 4-nitro-2,6-dichloroaniline, a dye compound is obtained which colors cellulose acetate textile materials reddish-brown shades.

EXAMPLE 13

21.6 grams of 5-nitro-2-aminophenylmethylsulfone are diazotized in accordance with the procedure described in Example 3 and the diazonium compound obtained is coupled with 24.7 grams of N-3,3,3-trifluoropropyl-N-γ-hydroxypropylaniline. Coupling and recovery of the dye compound formed is carried out in accordance with the procedure described in Example 3. The dye compound obtained colors cellulose acetate textile materials rubine shades.

By the use of 28.1 grams of N-3,3,3-trifluoropropyl-N-γ-hydroxypropyl - m - chloroaniline in place of N-3,3,3-trifluoropropyl-N-γ-hydroxypropylaniline, a dye compound is obtained which colors cellulose acetate textile materials pinkish-rubine shades.

EXAMPLE 14

24.1 grams of 4-nitro-2-trifluoromethyl-6-chloroaniline are diazotized in accordance with the procedure described in Example 1 and the diazonium compound obtained is coupled with 26.7 grams of N-3,3,3-trifluoropropyl-N-β-hydroxyethyl-m-chloroaniline. Coupling and recovery of the dye compound formed is carried out in accordance with the procedure described in Example 1. The dye compound obtained colors cellulose acetate textile materials brownish-orange shades.

By the use of 28.5 grams of 4-nitro-2-trifluoromethyl-6-bromoaniline in place of 4-nitro-2-trifluoromethyl-6-chloroaniline, a dye compound is obtained which colors cellulose acetate textile materials brownish-orange shades.

EXAMPLE 15

21.6 grams of 5-nitro-2-aminophenylmethylsulfone are diazotized in accordance with the procedure described in Example 3 and the diazonium compound obtained is coupled with 24.7 grams of N-3,3,3-trifluoropropyl-N-β-hydroxyethyl-m-toluidine. Coupling and recovery of the dye compound formed is carried out in accordance with the procedure described in Example 3. The dye compound obtained colors cellulose acetate textile materials rubine shades which have very good fastness to light and excellent fastness to gas.

By the use of 26.1 grams of N-3,3,3-trifluoropropyl-N-β-hydroxyethyl-m-ethylaniline in place of N-3,3,3-trifluoropropyl-N-β-hydroxyethyl-m-toluidine, a dye compound is obtained which colors cellulose acetate textile materials rubine shades which have very good fastness to light and excellent fastness to gas.

By contrast, the azo compound of the formula:

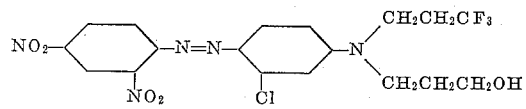

colors cellulose acetate textile materials rubine shades which have poor fastness to light.

EXAMPLE 16

24.1 grams of 4-nitro-2-trifluoromethyl-6-chloroaniline are diazotized in accordance with the procedure described in Example 1 and the diazonium compound obtained is coupled with 26.7 grams of N-2,2,2-trifluoroethyl-N-γ-hydroxypropyl-m-chloroaniline. Coupling and recovery of the dye compound formed is carried out in accordance with the procedure described in Example 1. The dye compound obtained colors cellulose acetate textile materials orange shades.

By the use of 24.7 grams of N-2,2,2-trifluoroethyl-N-γ-hydroxypropyl-m-toluidine in place of N-2,2,2-trifluoroethyl - N-γ- hydroxypropyl - m-chloroaniline, a dye compound is obtained which colors cellulose acetate textile materials orange shades.

EXAMPLE 17

20.7 grams of 4-nitro-2,6-dichloroaniline are diazotized in accordance with the procedure described in Example 1 and the diazonium compound obtained is coupled with 28.3 grams of N-2,2,2-trifluoroethyl - N-β,γ - dihydroxypropyl-m-chloroaniline. Coupling and recovery of the dye compound formed is carried out in accordance with the procedure described in Example 1. The dye compound obtained colors cellulose acetate textile materials orange shades.

By the use of 32.8 grams of N-2,2,2-trifluoroethyl-N-β,γ - dihydroxypropyl - m-bromoaniline in place of N-2,2,2-trifluoroethyl-N-β,γ-dihydroxypropyl-m-chloroaniline, a dye compound is obtained which colors cellulose acetate textile materials orange shades.

EXAMPLE 18

23.7 grams of 4-nitro-2-bromo-6-fluoroaniline are diazotized in accordance with the procedure described in Example 1 and the diazonium compound obtained is coupled with 21.9 grams of N-2,2,2-trifluoroethyl-N-β - hydroxyethylaniline. Coupling and recovery of the dye compound formed is carried out in accordance with the procedure described in Example 1. The dye compound obtained colors cellulose acetate textile materials orange shades.

By the use of 25.3 grams of N-2,2,2-trifluoroethyl-N-β-hydroxyethyl-m-chloroaniline in place of N-2,2,2-trifluoroethyl-N - β-hydroxyethylaniline, a dye compound is obtained which colors cellulose acetate textile materials orange shades.

Following the procedure described in Examples 1 to 18, inclusive, the dye compounds indicated hereinafter are prepared. The color stated is that which the dyes give on cellulose acetate textile materials.

| Diazo component | Coupling component | Color |
|---|---|---|
| 4-nitro-2,6-dichloroaniline | N-2,2,2-trifluoroethyl-N-β-hydroxyethyl-m-toluidine | Brownish-orange. |
| Do | N-2,2,2-trifluoroethyl-N-γ-hydroxypropyl-m-bromoaniline | Do. |
| 4-nitro-2-chloro-6-bromoaniline | N-2,2,2-trifluoroethyl-N-γ-hydroxypropyl-m-ethylaniline | Do. |
| Do | N-3,3,3-trifluoropropyl-N-γ-hydroxypropyl-m-chloroaniline | Brownish-red. |
| 4-nitro-2-chloro-6-fluoroaniline | N-3,3,3-trifluoropropyl-N-γ-hydroxypropyl-m-bromoaniline | Do. |
| Do | N-2,2,2-trifluoroethyl-N-β,γ-dihydroxypropyl-m-toluidine | Brownish-orange. |
| 4-nitro-2-chloro-6-methylaniline | N-2,2,2-trifluoroethyl-N-β,γ-dihydroxypropyl-m-ethylaniline | Do. |
| Do | N-3,3,3-trifluoropropyl-N-β,γ-dihydroxypropyl-m-chloroaniline | Do. |
| 4-nitro-2,6-dibromoaniline | N-3,3,3-trifluoropropyl-N-γ-hydroxypropyl-m-toluidine | Brownish-red. |
| Do | N-3,3,3-trifluoropropyl-N-β,γ-dihydroxypropyl-m-bromoaniline | Orange. |
| 4-nitro-2-bromo-6-fluoroaniline | N-3,3,3-trifluoropropyl-N-β,γ-dihydroxypropyl-m-toluidine | Brownish-red. |
| 4-nitro-2-bromo-6-methylaniline | N-3,3,3-trifluoropropyl-N-γ-hydroxypropyl-m-ethylaniline | Do. |
| 4-nitro-2-trifluoromethyl-6-bromoaniline | N-3,3,3-trifluoropropyl-N-β,γ-dihydroxypropyl-m-ethylaniline | Do. |
| 4-nitro-2-trifluoromethyl-6-chloroaniline | N-3,3,3-trifluoropropyl-N-β-hydroxyethyl-m-chloroaniline | Brownish-orange. |
| 5-nitro-2-aminophenyl-methylsulfone | N-3,3,3-trifluoropropyl-N-β,γ-dihydroxypropyl-m-ethylaniline | Rubine. |

It colors cellulose acetate, wool, nylon and silk textile materials red shades from an aqueous solution or suspension.

While not all of the compounds of my invention have been specifically described, the manner of preparing any of the compounds is believed to be obvious from the numerous examples given hereinbefore.

Dye compounds corresponding to those described hereinbefore but which contain at least one —OSO₃H group or this group in its salt form have also been prepared. These dye compounds containing a sulfato group are prepared either by introducing a sulfato group into the dye compounds previously described or by introducing a sulfato group into the coupling components of the present invention and coupling the compounds thus obtained with the diazonium compounds used in the preparation of the new azo compounds of the invention. These new dye compounds are suitable for dyeing the textile materials mentioned hereinbefore as well as silk, wool and nylon textile materials. Because of the increased water solubility of these new dye compounds, they are particularly adapted for dyeing cones of yarn and fabrics of close weave and of heavy construction.

The following examples illustrate the manner in which these new sulfato dye compounds are prepared.

EXAMPLE 19

46.0 grams of 2-methylsulfone-4-nitrobenzeneazo-N-3,3,3-trifluoropropyl-N-β-hydroxyethylaniline (dye of Example 3) are dissolved in 500 cc. of carbon tetrachloride and the resulting solution is cooled to 10° C. Then 12.7 grams of freshly distilled chlorosulfonic acid are added dropwise with stirring over a period of 3 hours. After the addition of the chlorosulfonic acid, the reaction mixture is slowly warmed to 50° C. and maintained at this temperature for several hours. Heating is then discontinued and the carbon tetrachloride is distilled off under reduced pressure. 300 cc. of ice and water are then added to the reaction mixture and the dye is recovered by evaporation. If a salt form of the dye is desired, the evaporation step is omitted. Instead, following the addition of the 300 cc. of ice and water, the reaction mixture is neutralized with sodium hydroxide (other suitable organic or inorganic bases can be used) warmed to dissolve the dye, filtered to remove any insoluble material and then concentrated under reduced pressure until the dye separates. The dye compound thus obtained has the formula:

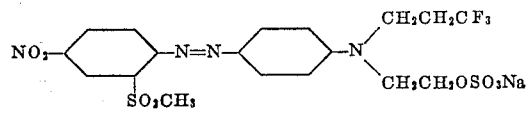

EXAMPLE 20

43.7 grams of 4-nitro-2,6-dichlorobenzeneazo-N-2,2,2-trifluoroethyl-N-β-hydroxyethylaniline (dye of Example 1) are dissolved in 200 cc. of pyridine and the resulting solution is cooled to 5° C. Then 12.7 grams of chlorosulfonic acid are added dropwise with stirring over a period of 3 hours. Stirring is continued for an additional 2 hours following which the reaction mixture is heated to 50° C. and maintained at this temperature for two hours. Following this the reaction mixture is cooled and the pyridine is removed under reduced pressure. 300 cc. of ice and water are then added to the reaction mixture and the dye is recovered by evaporation. The dye compound obtained colors cellulose acetate textile materials orange shades.

EXAMPLE 21

47.1 grams of 4-nitro-2-trifluoromethyl-6-chlorobenzeneazo-N-2,2,2-trifluoroethyl-N-β-hydroxyethylaniline (dye of Example 2) are mixed with 50 cc. of sulfuric acid (sp. gr. 1.84) and the reaction mixture resulting is warmed to 50° C. for 3 hours and then cooled to 0° C. 200 cc. of ice and water are added and the reaction mixture is made neutral to Congo red paper with sodium bicarbonate. The dye compound formed is recovered by filtration and washed with cold salt water. The dye compound thus obtained colors cellulose acetate, silk, wool and nylon orange shades.

EXAMPLE 22

21.6 grams of 5-nitro-2-aminophenylmethylsulfone are diazotized in accordance with the procedure described in Example 3 and the diazonium compound obtained is coupled with 32.1 grams of the sodium salt of N-2,2,2-trifluoroethyl-N-β-sulfatoethylaniline. Coupling and recovery of the dye compound formed is carried out in accordance with the procedure described in Example 3. The dye compound obtained colors cellulose acetate, wool, silk and nylon orange shades.

From the foregoing examples the manner of introducing a sulfato group into any of the azo compounds of my invention is believed to be clear, especially since the manner of introducing a sulfato group is known to those skilled in the art. Any other suitable way of introducing the sulfato group into the dye molecule can be employed. The sulfato group can be present in its free acid form or in the form of an inorganic or organic base salt such as, for example, the Na, K, NH4, Mg, Ca, Li, methylamine, dimethylamine, trimethylamine, pyridine, aniline, guanidine, semicarbazide, biguanidine, phenyl guanidine, cyclohexylamine, dicyclohexylamine, tetrahydrofurfurylamine or alkanolamine salt form.

In order that the preparation of the azo compounds of my invention may be clearly understood, the preparation of certain intermediates used in their manufacture is described hereinafter.

Example A.—4-nitro-2-trifluoromethyl-6-chloroaniline 990 grams of concentrated hydrochloric acid and 500 grams of glacial acetic acid were placed in a 2-liter flask equipped with a chlorine inlet tube, a gas escape tube attached to a water trap, a mechanical stirrer, a thermometer and a cooling bath. Then 206 grams of finely powdered 4-nitro-2-trifluoromethylaniline were added to the mixed acids. The reaction mixture was cooled to 10° C. and about 73 grams of chlorine were gradually introduced with vigorous stirring over a period of 4 to 6 hours while keeping the temperature between 10° C.–15° C. The reaction proceeded rapidly without much evolution of heat and 4-nitro-2-trifluoromethyl-6-chloroaniline separated as a fine yellow solid. Toward the end of the chlorination, the rate of addition of chlorine was materially lowered to avoid decomposition of the 4-nitro-2-trifluoromethyl-6-chloroaniline.

When about 73 grams of chlorine (or until a sample gives the desired melting point) had been absorbed, the chlorine addition was stopped and the reaction mixture stirred for one hour to complete the reaction. The reaction mixture was then filtered on a Buchner funnel to recover the precipitated 4-nitro-2-trifluoromethyl-6-chloroaniline. The filter cake was washed with 100 grams of acetic acid and then with 175 grams of water.

After drying, the compound melted at 112° C.–114° C. and after crystallization from acetic acid it melted at 115° C.–116° C. The yield of 4-nitro-2-trifluoromethyl-6-chloroaniline was 228 grams which is 95% of the theoretical.

Example B.—4-nitro-2-trifluoromethyl-6-bromoaniline 20.6 grams of 4-nitro-2-trifluoromethylaniline were dissolved in 100 cc. of acetic acid and 16.8 grams of bromine in 100 cc. of acetic acid were gradually added at 40° C. The reaction mixture was placed on a steam bath for 4 hours under a condenser. Then it was cooled and poured into ice water. 4-nitro-2-trifluoromethyl-6-bromoaniline precipitated as a yellow solid and was recovered by filtration. The filter cake was washed with a water solution of $NaHSO_3$, then with water and dried. It melted at 140° C.–142° C. The yield was 26 grams.

Example C.—4-nitro-2-chloro-6-fluoroaniline 90 grams of concentrated hydrochloric acid (sp. gr. 1.14), 50 grams of glacial acetic acid and 15.6 grams of 4-nitro-2-fluoroaniline were placed in a 3-necked 500 cc. round-bottomed flask, fitted with a stirrer and a thermometer. The reaction mixture resulting was cooled to 10° C.–15° C. and chlorine was slowly introduced to the stirred reaction mixture at 10° C.–15° C. until 7.5 grams had been taken up. This usually takes 2–4 hours. Stirring was continued for an additional hour and then the insoluble reaction product was recovered by filtration, washed with acetic acid and water and dried. 18.5 grams of 4-nitro-2-chloro-6-fluoroaniline were recovered as a yellow crystalline solid. It melts at 125° C.–127° C.

If desired, the chlorination can be carried out in a dilute sulfuric acid medium.

Example D.—4-nitro-2-bromo-6-fluoroaniline

This compound is obtained by the use of bromine in place of chlorine in Example C. It is a yellow crystalline solid.

Compounds having the formula:

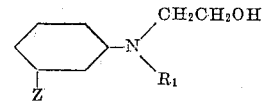

are prepared by reacting ethylene oxide with a compound having the formula:

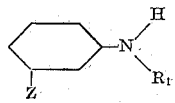

$R_1$ and $Z$ in the foregoing formulas have the meaning previously assigned to them.

The following examples are illustrative of the manner in which the compounds of the formula numbered IV are prepared.

Example E.—N-2,2,2-trifluoroethyl-N-β-hydroxyethylaniline 13.5 grams of N-2,2,2-trifluoroethylaniline and 4.84 grams of ethylene oxide dissolved in 10 cc. of ethyl alcohol were sealed in a glass tube and heated at 210° C.–220° C. for 20 hours, with shaking, in an autoclave. Upon cooling, the contents of the tube were removed. After removal of the alcohol by distillation at atmospheric pressure the reaction mixture was distilled under reduced pressure. 16 grams of N-2,2,2-trifluoroethyl-N-β-hydroxyethylaniline boiling at 102° C.–103° C./1.5 mm. were obtained.

Example F.—N-3,3,3-trifluoropropyl-N-β-hydroxyethylaniline 28.4 grams of N-3,3,3-trifluoropropylaniline and 8 grams of ethylene oxide dissolved in 30 cc. of ice-cold ethyl alcohol were placed in a glass tube which was cooled in ice. The tube was sealed and fastened into a shaking autoclave and heated at 185° C. for 24 hours with shaking. Upon cooling the autoclave and opening the tube, the reaction product was fractionated directly, first under atmospheric pressure to remove the ethyl alcohol and then under a reduced pressure of about 2 mm. An 84% yield of N-3,3,3-trifluoropropyl-N-β-hydroxyethylaniline boiling at 119° C.–120° C./2 mm. $N_D^{20}$ 1.5018 was obtained. Some unreacted N-3,3,3-trifluoropropylaniline was also recovered. It distilled over prior to the desired reaction product.

Example G.—N-3,3,3-trifluoropropyl-N-hydroxyethyl-m-toluidine 30.5 grams of N-3,3,3-trifluoropropyl-m-toluidine and 8 grams of ethylene oxide dissolved in 100 cc. of ice-cold ethyl alcohol were placed in an autoclave glass liner which was cooled in ice. The liner was then placed in an autoclave and heated at 185° C. for 24 hours with shaking. Upon cooling the autoclave, the reaction mixture was removed and fractionated directly, first under atmospheric pressure to remove the ethyl alcohol and then under a reduced pressure of about 2 mm. An 80% yield of N-3,3,3-trifluoropropyl-N-β- hydroxyethyl-m-toluidine boiling at 128° C.–129° C./2 mm., $N_D^{20}$ 1.4992, was obtained. Some unreacted N - 3,3,3 - trifluoropropyl - m - toluidine, which distilled over prior to the desired reaction product, was also recovered.

*Example H.—N-2,2,2-trifluoroethyl-N-β-hydroxyethyl-m-chloroaniline*

20.9 grams of N-2,2,2-trifluoroethyl-m-chloroaniline and 5.2 grams of ethylene oxide dissolved in 10 cc. of ice-cold ethyl alcohol were placed in a glass tube which was cooled in ice. The tube was sealed and fastened in a shaking autoclave which was heated to 185° C.–195° C. and maintained at this temperature for 16 to 18 hours. Upon cooling, the reaction mixture was removed from the tube and fractionated directly, first under atmospheric pressure to remove the ethyl alcohol and then under a reduced pressure of about 1 mm. 8 grams of N-2,2,2-trifluoroethyl-N - β - hydroxyethyl - m - chloroaniline boiling at 134° C.–137° C. was obtained.

In a manner similar to that described in Examples E, F, G and H, N-2,2,2-trifluoroethyl-N-β-hydroxyethyl-m-toluidine, B. P. 103° C.–104° C./2 mm.; N - 2,2,2 - trifluoroethyl-N-β-hydroxyethyl-m-ethylaniline, B. P. 114° C.–117° C./1.5 mm.; N-2,2,2 - trifluoroethyl-N-β-hydroxyethyl-m-bromoaniline, B. P. 153° C.–157° C./2 mm.; N - 3,3,3 - trifluoropropyl - N - β - hydroxyethyl-m-chloroaniline, B. P. 145° C./2 mm., etc., are prepared.

Compounds having the formula:

VI 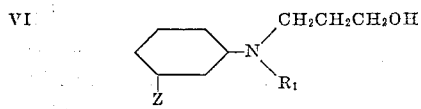

wherein $R_1$ and Z have the meaning previously assigned to them are prepared by reacting trimethylene chlorohydrin or trimethylene bromohydrin with a compound having the Formula V.

The following examples are illustrative of the manner in which the compounds having the formula numbered VI are prepared.

*Example I.—N-2,2,2-trifluoroethyl-N-γ-hydroxypropylaniline*

52.5 grams of N-2,2,2-trifluoroethylaniline and 30 grams of trimethylene chlorohydrin are heated together on a steam bath for 10 hours. The reaction mixture is cooled and 10% aqueous NaOH is added thereto until it is alkaline. The reaction mixture is then treated with benzene and the benzene portion is removed, washed with water and distilled under reduced pressure. N-2,2,2-trifluoroethyl-N-γ-hydroxypropylaniline boiling at 122° C.–124° C./2 mm. is obtained.

*Example J.—N-3,3,3-trifluoropropyl-N-γ-hydroxypropylaniline*

56.7 grams of N-3,3,3-trifluoropropylaniline are reacted with 30 grams of trimethylene chlorohydrin in accordance with the procedure described in Example I. N-3,3,3-trifluoropropyl-N-γ-hydroxypropylaniline boiling at 131° C.–135° C./2 mm. is obtained.

*Example K.—N-2,2,2-trifluoroethyl-N-γ-hydroxypropyl-m-toluidine*

56.7 grams of N-2,2,2-trifluoroethyl-m-toluidine, 46.4 grams of trimethylenebromohydrin and 30.5 grams of NaHCO₃ are heated at 140° C. for 6 hours with stirring. Upon cooling, benzene is added to the reaction mixture and the reaction mixture is filtered. The benzene is removed from the filtrate, for example, by distillation over a water bath, and the portion remaining is distilled under reduced pressure to obtain N-2,2,2-trifluoroethyl-N-γ-hydroxypropyl-m-toluidine boiling at 126° C.–128° C./2 mm.

Following the procedure described in Examples I, J and K, N-2,2,2-trifluoroethyl-N-γ-hydroxypropyl-m-chloroaniline, B. P. 154° C./157° C./2.5 mm.; N-2,2,2-trifluoroethyl-N-γ-hydroxypropyl-m-bromoaniline, B. P. 165° C.–170° C./2.5 mm.; N-3,3,3-trifluoropropyl - N-γ-hydroxypropyl-m-chloroaniline, 164° C.–167° C./2.5 mm.; N-3,3,3-trifluoropropyl-N - γ-hydroxypropyl-m-toluidine, 133° C.–137° C./1.5 mm.; etc., are prepared.

Compounds having the formula:

VII 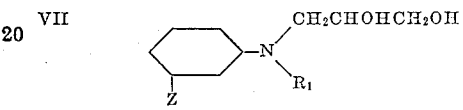

wherein $R_1$ and Z have the meaning previously assigned to them are prepared by reacting glycerol chlorohydrin with a compound having the formula V.

The following examples are illustrative of the manner in which the compounds of the formula numbered VII are prepared.

*Example L.—N - 2,2,2-trifluoroethyl-N-β,γ-dihydroxypropylaniline*

17.5 grams of N-2,2,2-trifluoroethylaniline, 10 grams of NaHCO₃, 100 cc. of amyl alcohol and 12 grams of glyceryl chlorohydrin are heated together under refluxing conditions for 6–10 hours. Then 2 grams of charcoal are added and the reaction mixture is stirred awhile and then filtered to remove the charcoal, salt and any other insoluble material. The amyl alcohol is removed and the reaction mixture is steam-distilled to remove any unchanged N-2,2,2-trifluoroethylaniline. Following this, the reaction mixture is extracted with benzene and the benzene extract is distilled to dryness under a reduced pressure of about 1 mm. to obtain N-2,2,2-trifluoroethyl-N-β,γ-dihydroxypropylaniline.

*Example M.—N-3,3,3-trifluoropropyl-N-β,γ-dihydroxypropylaniline*

18.9 grams of N-3,3,3-trifluoropropylaniline and 9.2 grams of NaHCO₃ are stirred and heated together at 145° C. on an oil bath while 12.2 grams of glyceryl chlorohydrin are slowly added. After the addition, heating and stirring at 145° C. are continued for 6 hours. An equal volume of water is then added to the reaction mixture and the reaction mixture is extracted three times with benzene. The benzene solution is then steam-distilled leaving the reaction product as an oily residue. Upon distilling the crude product in a molecular still (i. e. a Hickman molecular still manufactured by Distillation Products, Inc., Rochester, N. Y.) under a reduced pressure of 22 microns at 105° C., N-3,3,3-trifluoropropyl-N-β,γ-dihydroxypropylaniline is obtained.

*Example N.—N-3,3,3-trifluoropropyl-N-β,γ-dihydroxypropyl-m-toluidine*

19.9 grams of N-3,3,3-trifluoropropyl-m-toluidine, 9.2 grams of NaHCO₃ and 12.2 grams of glyceryl chlorohydrin are heated together under refluxing conditions for 7 hours. Then 2 grams of charcoal are added and the reaction mixture is stirred awhile and then filtered to remove the charcoal, salt and any other insoluble material. The crude reaction product thus obtained is distilled in a molecular still under a reduced pressure of 13 microns at 95° C.–100° C. N-3,3,3-trifluoropropyl - N - β,γ - dihydroxypropyl - m-toluidine is obtained.

Following the procedure described in Examples L, M and N, N-2,2,2-trifluoroethyl-N-β,γ-dihydroxypropyl-m-chloroaniline, N-2,2,2-trifluoroethyl-N-β,γ - dihydroxypropyl - m - toluidine, N - 3,3,3 - trifluoropropyl - N - β,γ - dihydroxypropyl-m-chloroaniline, etc. are prepared.

Compounds having the formula numbered V are prepared by reacting a compound having the formula:

VIII 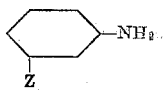

with 1,1,1-trifluoro-2-bromoethane ($CF_3CH_2Br$) or 1,1,1-trifluoro-2-chloroethane ($CF_3CH_2Cl$) and 1,1,1-trifluoro-3-chloropropane ($CF_3CH_2CH_2Cl$), respectively.

The following examples are illustrative of the manner in which the compounds of the formula numbered V are prepared.

*Example O.—N-3,3,3-trifluoropropylaniline*

46.5 grams of aniline and 33.3 grams of $CF_3CH_2CH_2Cl$ were placed in a glass tube. The tube was sealed, fastened in a shaking autoclave and heated up to 185° C. with shaking. Heating at 185° C. with shaking was continued for 24 hours and then the autoclave was cooled. On opening the tube, the reaction mixture was treated with an excess of 10% NaOH solution to decompose any aniline hydrochlorides present, and the oily layer was taken up in a small amount of benzene. The benzene layer was washed until neutral and dried over Drierite (anhydrous calcium sulfate) after which it was fractionated under atmospheric pressure to remove the benzene and then under a reduced pressure of about 15 mm. Aniline was first recovered and then better than a 50% yield of N-3,3,3-trifluoropropylaniline boiling at 101° C.–103° C./15 mm., $N_D^{20}$ 1.4847.

*Example P.—N-3,3,3-trifluoropropyl-m-toluidine*

53.5 grams of m-toluidine and 33.3 grams of $CF_3CH_2CH_2Cl$ were heated in a sealed tube in a shaking autoclave at 185° C. for 24 hours in accordance with the procedure described in Example O. A good yield of N-3,3,3-trifluoropropyl-m-toluidine boiling at 114° C.–116° C./15 mm., $N_D^{20}$ 1.4848 was obtained.

*Example Q.—N-2,2,2-trifluoroethylaniline*

40 grams of 1,1,1-trifluoro-2-chloroethane and 64.6 grams of aniline were placed in a glass tube cooled in an acetone Dry Ice bath. The tube was sealed, fastened in a shaking autoclave and heated at 250° C.–255° C. for thirty hours. Upon cooling, the tube was opened and the contents poured into a mixture of 420 cc. of water and 80 grams of hydrochloric acid (sp. gr. 1.18). The dilute acid completely dissolves any unreacted aniline while the less basic N-trifluoroethylaniline and by-product diphenylamine are insoluble. The reaction mixture was extracted with two 50 gram portions of benzene. The two benzene extracts were combined, washed free of acid and then distilled under a reduced pressure of about 15 mm. 24.1 grams of N-2,2,2-trifluoroethylaniline boiling at 84° C.–85° C./15 mm., $N_D^{20}$ 1.4820 were obtained.

Following the procedure described in Examples O, P and Q, N-2,2,2-trifluoroethyl-m-chloroaniline, B. P. 73° C./2 mm.; N-2,2,2-trifluoroethyl-m-toluidine, B. P. 96° C.–97° C./15 mm., $N_D^{25}$ 1.4797; N - 3,3,3-trifluoropropyl-m-chloroaniline, B. P. 145° C./2mm.; etc., are prepared.

The azo dye compounds of my invention can be applied to the textile materials named hereinbefore in the form of an aqueous dispersion and are ordinarily so applied. To illustrate, the dye compound is finely ground with a dispersing agent such as sodium lignum sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dye-bath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried.

The procedure just described is applicable whether the dye compound contains a sulfato group or not. The dye compounds of the invention not containing a sulfato group are practically water-insoluble. Where a sulfato group is present, the water solubility is increased and in such case a greater amount of the dye will go into solution.

Widely varying amounts of dye can be used in the dyeing operation. The amount of dye used can be, for example, ⅓ to 3% (by weight) of that of the textile material, although lesser or greater amounts of dye can be employed.

This application is a continuation-in-part of my copending application Serial No. 631,469, filed November 28, 1945, now U. S. Patent 2,516,303. N-trifluoroalkylaminobenzene compounds are described and claimed in my copending application Serial No. 624,942, filed October 26, 1945, now U. S. Patent 2,516,106.

I claim:

1. The azo compounds having the general formula:

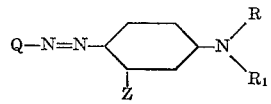

wherein Q—N=N— represents the diazonium form of a primary aromatic amine selected from the group consisting of 4-nitro-2,6-dichloroaniline, 4-nitro-2-chloro-6-bromoaniline, 4 - nitro-2-chloro-6-fluoroaniline, 4-nitro-2-chloro-6-methylaniline, 4-nitro-2-trifluoromethyl-6-chloroaniline, 4-nitro-2,6-dibromoaniline, 4-nitro-2-bromo-6-fluoroaniline, 4-nitro-2-bromo-6-methylaniline, 4-nitro-2-trifluoromethyl-6-bromoaniline and 5-nitro-2-aminophenylmethylsulfone, R represents a member selected from the group consisting of a β-sulfatoethyl group, a γ-sulfatopropyl group and a sulfated β,γ-dihydroxypropyl group, $R_1$ represents a member selected from the group consisting of a 2,2,2-trifluoroethyl group and a 3,3,3-trifluoropropyl group and Z represents a member selected from the group consisting of a hydrogen atom, a bromine atom, a chlorine atom, a methyl group and an ethyl group.

2. The azo compounds having the general formula:

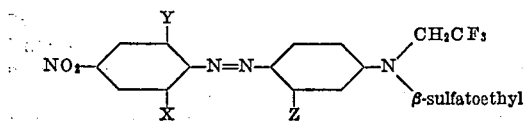

wherein X represents a member selected from the group consisting of a bromine atom and a chlorine atom, Y represents a member selected from the group consisting of a bromine atom, a chlorine atom, a fluorine atom, a methyl group and a trifluoromethyl group and Z represents a member selected from the group consisting of a hydrogen atom, a bromine atom, a chlorine atom, a methyl group and an ethyl group.

3. The azo compounds having the general formula:

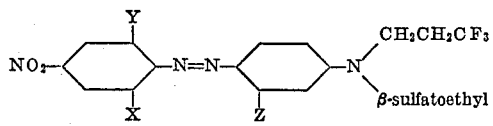

wherein X represents a member selected from the group consisting of a bromine atom and a chlorine atom, Y represents a member selected from the group consisting of a bromine atom, a chlorine atom, a fluorine atom, a methyl group and a trifluoromethyl group and Z represents a member selected from the group consisting of a hydrogen atom, a bromine atom, a chlorine atom, a methyl group and an ethyl group.

4. The azo compound having the formula:

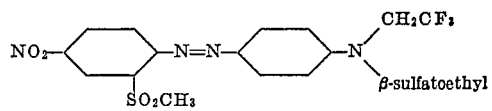

5. The azo compound having the formula:

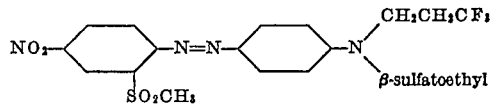

6. The azo compound having the formula:

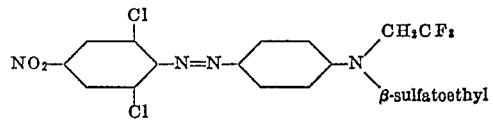

7. The azo compound having the formula:

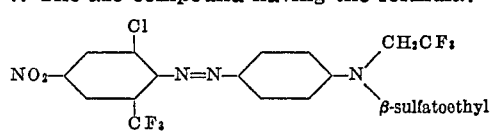

JOSEPH B. DICKEY.

REFERENCES CITED

The following references are of record in the file of this patent:

UNITED STATES PATENTS

| Number    | Name       | Date           |
|-----------|------------|----------------|
| 2,115,412 | Dahlen     | Apr. 26, 1938  |
| 2,118,661 | Baumann    | May 24, 1938   |
| 2,131,894 | Knight     | Oct. 4, 1938   |
| 2,194,927 | Daudt      | Mar. 26, 1940  |
| 2,384,734 | Felix et al. | Sept. 11, 1945 |
| 2,432,393 | Dickey et al. | Dec. 9, 1947 |